United States Patent

Prakash et al.

Patent Number: 5,841,627
Date of Patent: Nov. 24, 1998

[54] PSEUDO-CAPACITOR DEVICE FOR AQUEOUS ELECTROLYTES

[76] Inventors: Jai Prakash, 3849 NW. 65th Ave., Gainesville, Fla. 32653; Michael M. Thackeray, 1763 Cliffside Ct., Naperville, Ill. 60565; Dennis W. Dees, 6224 Middaugh Ave., Downers Grove, Ill. 60516; Donald R. Vissers, 611 Clover Ct., Naperville, Ill. 60540; Kevin M. Myles, 1231 60th Pl., Downers Grove, Ill. 60516-1856

[21] Appl. No.: 868,176

[22] Filed: Jun. 3, 1997

[51] Int. Cl.$^6$ ........................................... H01G 9/00
[52] U.S. Cl. ........................... 361/502; 361/303; 361/305
[58] Field of Search ....................................... 361/303–305, 361/502–503, 508, 516, 523, 528, 532; 252/182.1, 519.13; 29/25.42

[56] References Cited

U.S. PATENT DOCUMENTS 4,124,530  11/1978  Horowitz et al. ........................ 252/518

OTHER PUBLICATIONS

Article entitled Oxygen Electrocatalysis on Some Oxide Pyrochlores, by H.S. Horowitz et al., for Exxon Research and Engineering Company, Corporate Research Labrotories, Linden, New Jersey 07036, published in *Journal of the Electrochemical Society: Electrochemical Science and Technology*, vol. 130, Sep. 1983.

*Primary Examiner*—Bot L. Ledynh
*Attorney, Agent, or Firm*—Emrich & Dithmar

[57] ABSTRACT

A pseudo-capacitor having a high energy storage capacity develops a double layer capacitance as well as a Faradaic or battery-like redox reaction, also referred to as pseudo-capacitance. The Faradaic reaction gives rise to a capacitance much greater than that of the typical ruthenate oxide ultracapacitor which develops only charge separation-based double layer capacitance. The capacitor employs a lead and/or bismuth/ruthenate and/or iridium system having the formula $A_2[B_{2-x}Pb_x]O_{7-y}$, where A=Pb, Bi, and B=Ru, Ir, and $0<x\leq1$ and $0<y<0.5$ and limits the amount of ruthenate and/or iridium in the electrodes while increasing the energy storage capacity. The ruthenate can be synthesized at low temperatures (40°–80° C.) to form a compound with a high surface area and high electronic conductivity which, in combination with the increased pseudo-capacitance, affords high energy/power density in the pseudo-capacitor. The amount of expensive ruthenate and iridium can be substantially reduced in the pseudo-capacitor by increasing the lead content while improving energy storage capacity.

3 Claims, 4 Drawing Sheets

PSEUDO-CAPACITOR DEVICE FOR AQUEOUS ELECTROLYTES

CONTRACTUAL ORIGIN OF THE INVENTION

The United States Government has rights in this invention pursuant to Contract No. W-31-109-ENG-38 between the U.S. Department of Energy and The University of Chicago representing Argonne National Laboratory.

FIELD OF THE INVENTION

This invention relates generally to energy storage devices and is particularly directed to a pseudo-capacitor device for aqueous electrolytes having high stored energy/power density.

BACKGROUND OF THE INVENTION

In an effort to produce automobiles having increased energy efficiency, the Department of Energy has initiated a new program called "Partnership for a New Generation Vehicle" (PNGV). One aspect of this effort is to develop a hybrid vehicle using either a fuel cell or a small internal combustion engine coupled to an electric energy storage device. During normal driving, the fuel cell or internal combustion engine would supply the required energy while the energy storage device could provide an efficient means for storing energy output when the vehicle is coasting, or stopped, and also for storing and recovering the energy dissipated during braking. The stored energy could subsequently be used to supply additional power for acceleration, as well as the supplemental power needed by the vehicle to meet sustained power needs such as during hill climbing.

Electric energy storage devices under investigation for these applications include high power batteries and ultracapacitors. These types of devices have met with only limited success. For example, batteries are expensive and have a limited lifetime, i.e., a battery can be charged and discharged only a limited number of times before replacement is necessary. Batteries are also heavy, adding substantial weight to the vehicle. Moreover, the power pulses required for accelerating a vehicle are quite high and exceedingly frequent and are of significant duration (10–20 sec.). Because a battery is unable to achieve more than a few thousand high power output pulses, its available power output is far short of the hundreds of thousands of output pulses needed during the lifetime of a hybrid vehicle.

Ultracapacitors behave like very high power, low capacity batteries, but store energy by accumulating and separating unlike charges physically, as opposed to batteries which store energy chemically in reversible chemical reactions. The typical ultracapacitor, also known as a "double layer capacitor," is formed from material with extremely high surface area and high electronic conductivity. The energy in the ultracapacitor is stored by charge separation in a vast number of micropores within the electrode material. In this double layer capacitor, the current produced during the charge/discharge process arises from the adsorption-desorption of the electrolyte ions at the electrode-electrolyte interface and tends to be limited. In a double layer capacitor, unlike a battery, there is no charge transfer reaction at the interface, and hence there is no Faradaic current involved in the charge-discharge process as in a conventional storage battery. This limits the power output of the typical ultracapacitor.

Referring to FIG. 1, there is shown a simplified schematic diagram of a conventional galvanic ultracapacitor 10 incorporating metal oxide electrodes in an aqueous electrode such as $H_2SO_4$. In the figure, the network of large and small circles represents in simplified form a metal oxide electrode, with the smaller circles representing the metal, the larger circles representing oxygen, and lines joining the larger and smaller circles representing bonds between the metal and oxygen ions. The galvanic ultracapacitor 10 includes a plurality of positive ions 12 physically separated from a plurality of negative ions 14. There is no charge transfer reaction at the interface 20 in the galvanic ultracapacitor 10, with the current involved during the charge/discharge process due to the adsorption-desorption of the positive and negative ions 12, 14 at the electrode-electrolyte interface. A volt meter 16 coupled between the positive and negative ions 12, 14 records a voltage when switch 18 is closed. Because there is no Faradaic current involved in the charge-discharge process of the galvanic ultracapacitor 10, this energy storage device is of limited potential in applications where long life, extended high energy output, and light weight are required.

The present invention addresses the aforementioned limitations of the prior art by providing an electrode material for use in a pseudo-capacitor which not only develops the double layer capacitance of a conventional ultracapacitor, but also develops a Faradaic or pseudo-capacitance. Because of this redox reaction, the capacitance of the inventive pseudo-capacitor is much greater than that of a conventional ultracapacitor while affording the inherent excellent cycle life characteristics of an ultracapacitor. The inventive pseudo-capacitor incorporates reduced amounts of ruthenium and/or iridium for reduced cost.

OBJECTS AND SUMMARY OF THE INVENTION

Accordingly, it is an object of the present invention to provide a ruthenate- or iridium-based pseudo-capacitor having a high energy storage capacity at a reduced cost.

It is another object of the present invention to provide a pseudo-capacitor for storing energy employing charge separation in the micropores of its electrodes and a Faradaic or battery-like redox reaction.

Yet another object of the present invention is to provide a pseudo-capacitor having a greater capacitance than that of a conventional ultracapacitor while affording the life-cycle characteristics of an ultracapacitor.

A still further object of the present invention is to provide a pseudo-capacitor energy storage device having a substantially reduced amount of ruthenate and/or iridium in its electrode material while affording increased energy storage capacity.

This invention contemplates a pseudo-capacitor electric energy storage device comprising lead ruthenate and/or lead iridium electrodes, wherein the electrodes have a large number of micropores and a capacitance arising from double layer capacitance due to charge separation in the micropores of the electrodes and further arising from a Faraday redox reaction, and wherein the electrodes have the formula

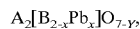

where
 A=Pb and/or Bi,
 B=Ru and/or Ir,
and $0 < x \leq 1$, $0 < y < 0.5$.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, in which:

DETAILED DESCRIPTION OF THE PREFERRED EMBODIMENTS

Figure 1:
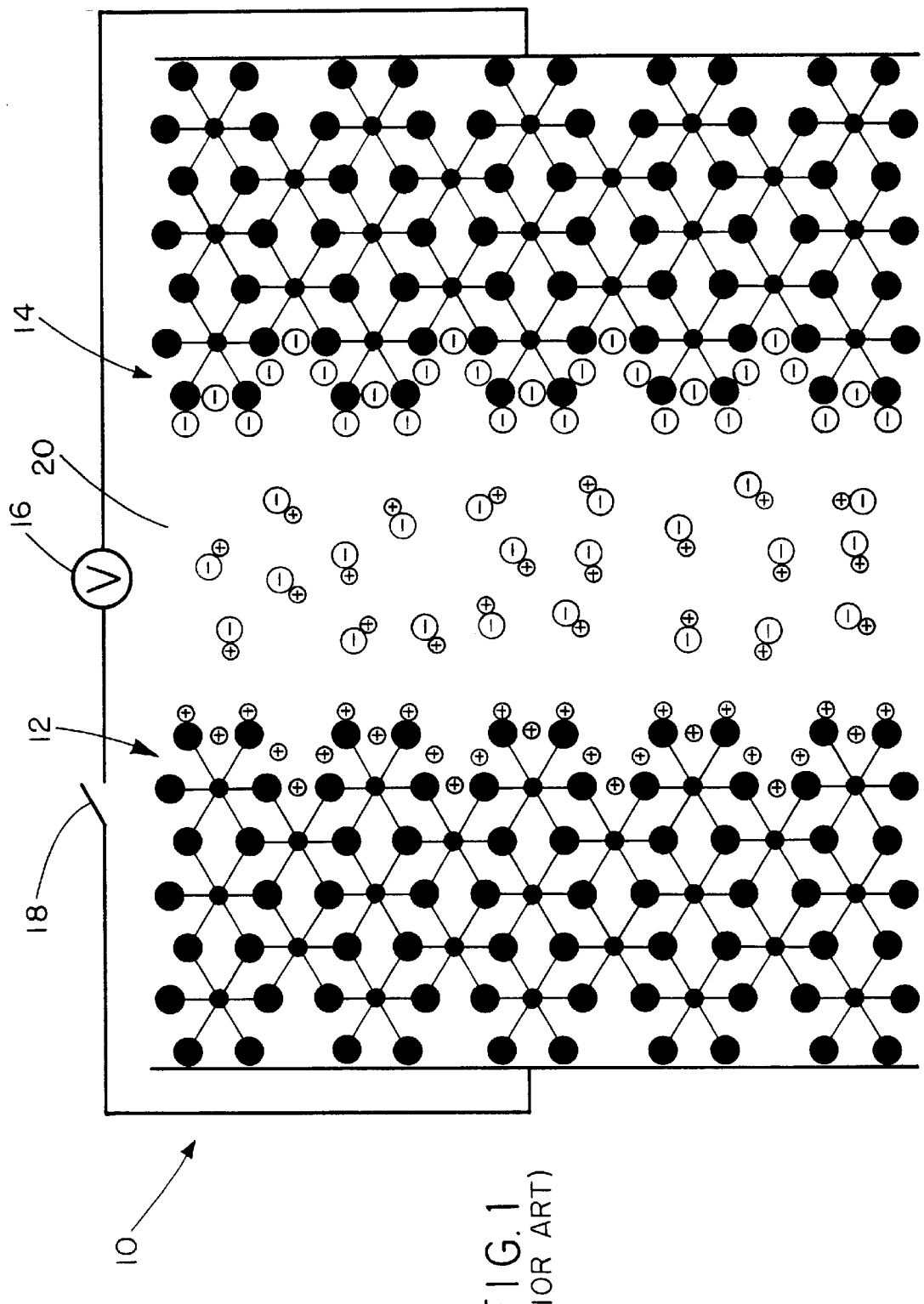
FIG. 1 is a simplified schematic diagram of a conventional galvanic ultracapacitor having metal oxide electrodes in an aqueous electrolyte such as of $H_2SO_4$.

The present invention is directed to a pseudo-capacitor characterized as storing energy by charge separation in a vast number of micropores within the electrode material to provide a "double layer capacitor". The current generated during the charge/discharge process arises from the absorption-desorption of the electrolyte ions at the electrode-electrolyte interface. In addition, a Faradaic or battery-like redox reaction occurs which is sometimes referred to as a pseudo-capacitance. Because of this reaction, the capacitance of a pseudo-capacitor comprised of a ruthenate oxide is much greater than that of an ultracapacitor, while the life-cycle characteristics of the ultracapacitor are retained. To reduce the cost of the expensive ruthenate electrode materials, the capacitor utilizes a lead ruthenate system having the formula $A_2[B_{2-x}Pb_x]O_{7-y}$, where A=Pb, Bi, and B=Ru, Ir, and $0<x \leq 1$ and $0<y<0.5$. Thus, while the present invention is described primarily in terms of replacing a portion of the ruthenium with lead in the pseudo-capacitor's electrode structure, it is not limited to this and also contemplates replacing a portion of the iridium in an iridium-based electrode with bismuth. In addition, bismuth may be used to replace a portion of the ruthenium and lead may be used to replace a portion of the iridium in the pseudo-capacitor's electrode structure. The following discussion is primarily in terms of a ruthenate-based pseudo-capacitor for the purpose of simplicity and not as a limitation of the present invention.

A pseudo-capacitor having an electrode with the above formula has a significantly greater surface redox reaction than available in a conventional pseudo-capacitors with a ruthenate dioxide electrode. The lead ruthenate electrode can be synthesized at low temperatures as described below to form a compound with a high surface area and high electronic conductivity. The amount of ruthenium and iridium can be substantially reduced by increasing the lead or bismuth content in accordance with the present invention. Lead ruthenate containing only 10% ruthenate metal has been found to compare favorably in energy storage and release characteristics with materials containing 76% ruthenate, while outperforming other prior art capacitors in these operating characteristics. The low amount of ruthenium in the lead ruthenate electrodes is particularly important for producing a low cost energy storage device.

The lead ruthenate pyrochlore phase $[Pb_2Ru_2O_{6.5}]$ can be synthesized by a low temperature (10°–80° C.) aqueous reaction to produce high surface area materials. The starting materials are typically metal salts such as lead acetate trihydrate $[Pb(CH_3CO_2)_2 \cdot 3H_2O]$ and ruthenium nitrosyl nitrate $(Ru(NO)(NO_3)_3 \cdot 2H_2O)$. Stoichiometric amounts of the starting material are dissolved in oxygen saturated water at 70° C. After two hours of mixing while bubbling $O_2$ through the solution, a KOH (12–14 pH) solution is added to raise the pH to 12–14. The solution is mixed while bubbling $O_2$ through it for another ~10 hours at 70° C. When the solution is cooled to room temperature, a dark brown/black precipitate of lead ruthenate forms and eventually settles at the bottom of the flask. The precipitate can be collected by filtration and washed and identified by powder diffraction.

Figure 2:
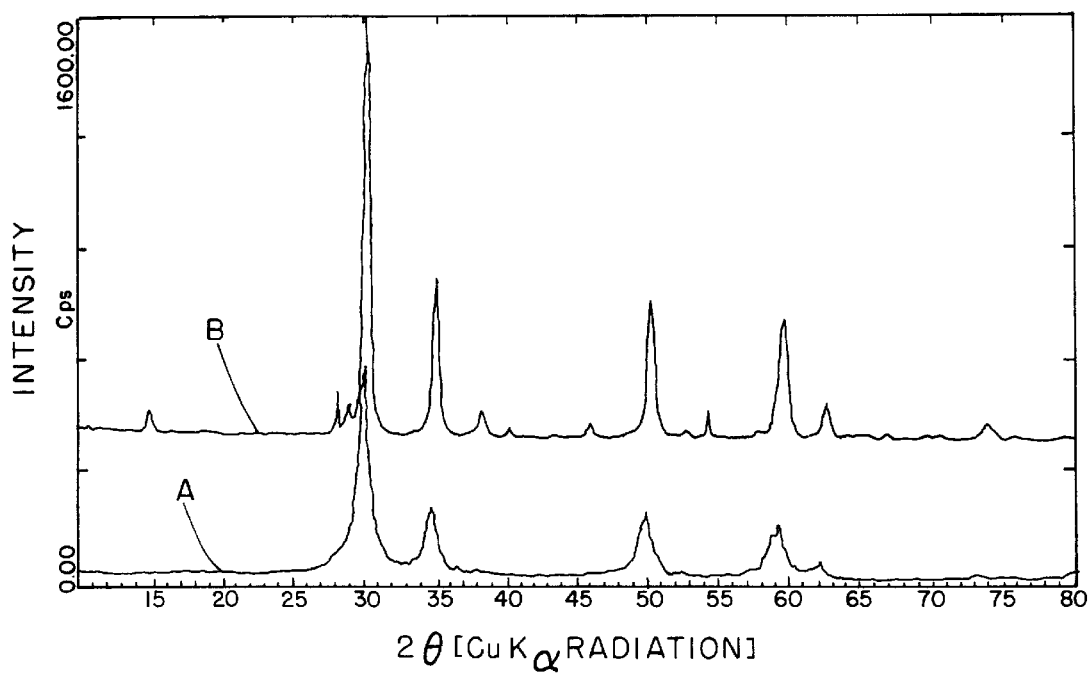
FIG. 2 is a graphic representation of X-ray powder diffraction of (A) a high surface lead ruthenate synthesized in accordance with the present invention and (B) the lead ruthenate after calcination at 700° C. for one hour.

Referring to FIG. 2, there is shown a graphic representation of X-ray powder diffraction of a high surface lead ruthenate synthesized in accordance with the present invention in graph A, and lead ruthenate after calcination at 700° C. for one hour in graph B. The difference in graphs A and B illustrates that the lead ruthenate precipitate after high temperature calcination is distinguishable from the lead ruthenate as synthesized.

The lead-rich lead ruthenate pyrochlore phase $[Pb_2(Ru_{2-x}Pb_x)O_{7-y}]$ can be synthesized by the same process with the addition of excess lead acetate trihydrate to the initial reaction solution. Any lead oxide formed due to an excess of lead salt can be leached from the final precipitate by washing with acetic acid. In this manner, the amount of ruthenium in lead ruthenate can be reduced to 10% by weight compared to 75% for ruthenium oxide while still retaining a greater number of surface redox reactions of the ruthenate compound. The surface area of the lead ruthenate particles can be maximized by rapidly cooling the hot solution. Cooling in an ice bath results in the formation of a powder with a BET surface area of 120 $m^2/g$. The initial surface area can be varied from 10–150 $m^2/g$.

An alternate method for the synthesis of lead ruthenate involves the solid state reaction of lead oxide $(Pb_2O_3)$ and ruthenium oxide $(RuO_2)$. The powders are mixed stoichiometrically by grinding, pressing into pellets, and firing in air or oxygen at 600° C. for ~10 hours. The grinding and firing process may be repeated to increase the purity of the final product. Surface areas for these materials are typically below 10 $m^2/g$.

Figure 3:
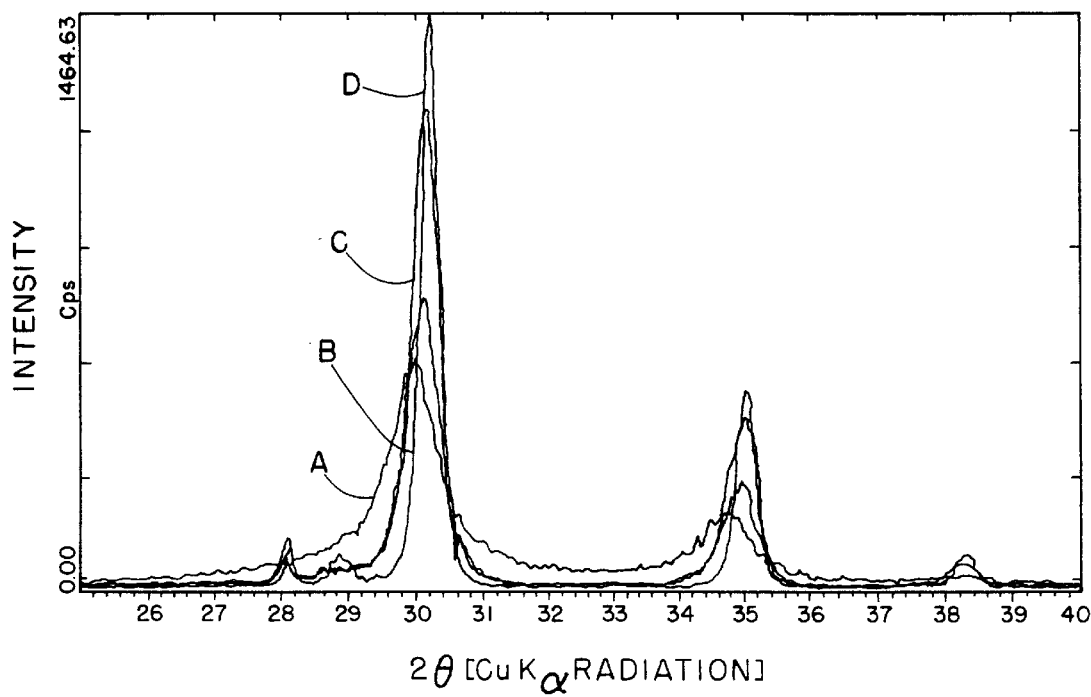
FIG. 3 is a graphic representation of X-ray powder diffraction of lead ruthenate in accordance with the present invention after various calcining treatments in air.
Figure 4:
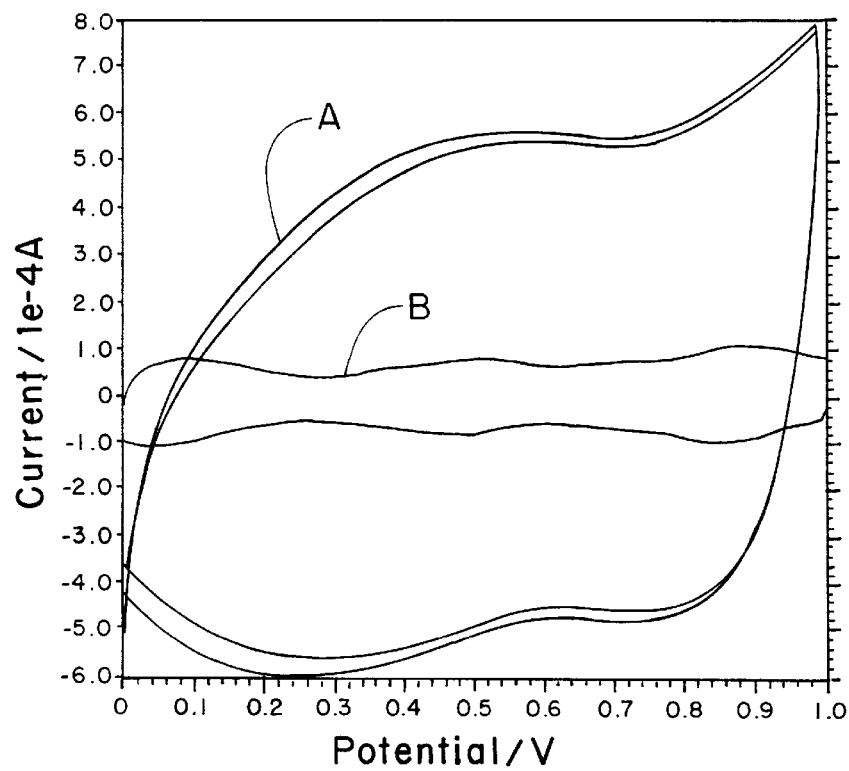
FIG. 4 is a graphic comparison of the cyclic voltammetric behavior of lead ruthenate before and after calcination illustrating a decrease in electrode capacitance.
Figure 5:
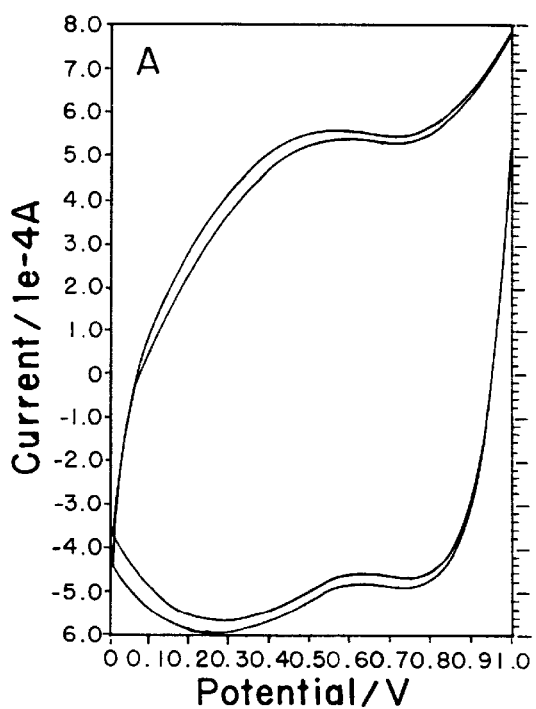
FIGS. 5 and 6 are graphic representations of a comparison of the cyclic voltammetric behavior of lead ruthenate before and after calcination to show the increased definition of Faradaic peaks with no treatment and after one hour at 70° C., respectively.
Figure 6:
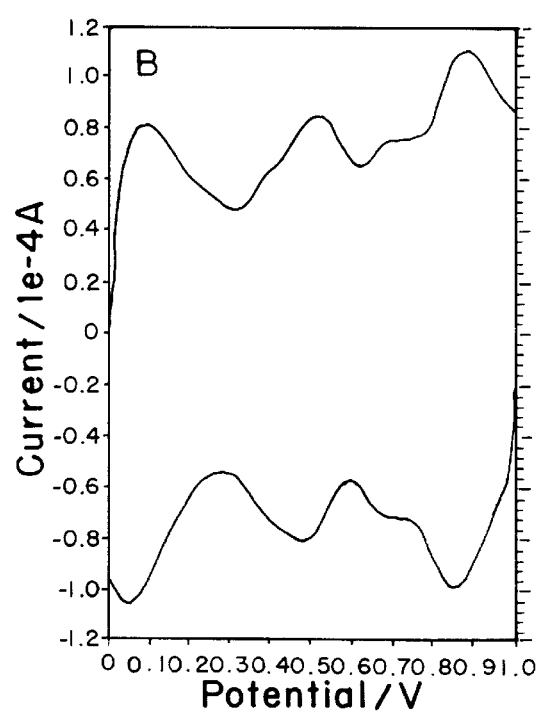

High surface area powders can be further treated by calcination in air or oxygen to decrease the surface area, increase particle size, and modify the surface chemistry. For example, a 120 m²/g sample with an average grain size of ~100 Å when fired at 700° C. for one hour undergoes a reduction of the surface area to 20 m²/g with an average grain size of ~300 Å as shown by graph C in FIG. 3. The extent of change depends on the time the lead ruthenate is in the furnace and the temperature to which it is heated. In FIG. 3, various graphs representing the X-ray powder diffraction of the lead ruthenate after various calcining treatments in air are shown. Thus, graph A in FIG. 3 is the diffraction pattern for no treatment (BET surface area=120 m²/g, average grain size=90 Å). Graph B is the diffraction pattern after the lead ruthenate is heated for five minutes at 700° C. (BET surface area=24 m²/g, average grain size=130 Å). Graph C is the diffraction pattern for the lead ruthenate after one hour of heating at 700° C. (BET surface area=17 m²/g, average grain size=180 Å). Finally, graph D is the diffraction pattern for the lead ruthenate after being heated for one hour at 700° C. followed by one hour of heat at 900° C. (BET surface area=10 m²/g, average grain size=300 Å). The reduction in surface area with increased heat treatment shown in graphs A–D in FIG. 3 decreases the contribution of double-layer processes to the overall capacitance of the material as can be seen by the cyclic voltammetry graphs in FIG. 4. FIG. 4 is a graphic comparison of the cyclic voltametric behavior of lead ruthenate before and after calcination illustrating a decrease in electrode capacitance. For the results shown in FIG. 4, approximately 20 mg of material was used for both electrodes, with graph A representing the cyclic voltommetric behavior of lead ruthenate with no treatment (BET surface area=120 m²/g, average grain size=90 Å), and graph B representing the cyclic voltammetric behavior of lead ruthenate heated for one hour at 700° C. (BET surface area=120 m²/g, average grain size=180 Å). However, calcination also results in a more crystalline or homogeneous surface, resulting in better defined Faradaic processes as shown in FIGS. 5 and 6 which are respectively graphic illustrations of the cyclic voltammetric of lead ruthenate before calcination (BET surface area=120 m²/g, average grain size=90 Å) and after calcination at 700° C. for one hour showing increased definition of the Faradaic peaks (BET surface area=120 m²/g, average grain size=180 Å). Thus, calcination of the powder permits control over the relative contributions of double-layer versus Faradaic processes to the overall capacitance of the inventive electrode material.

The lead ruthenate electrode material of the present invention is also well suited to the lamination technique commonly used to make electrodes for Li-ion batteries. The lamination method results in very thin, robust sheets that can be formed directly on a current collector or from which electrodes can be punched out. It is important that the active material can be processed in this manner to reduce the overall impedance of the cell. High surface area carbon can be added to increase the electrical contact between particles and to increase the double-layer capacitance of the electrode.

Figure 7:
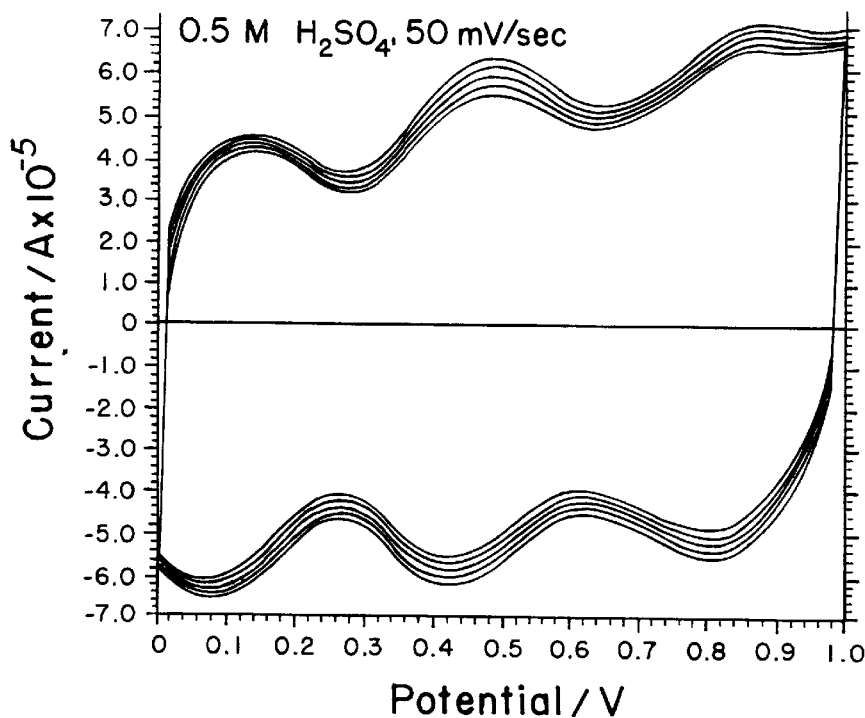
FIG. 7 is a cyclic voltammogram of a lead ruthenate electrode in accordance with the principles of the present invention in 0.5M $H_2SO_4$.
Figure 8:
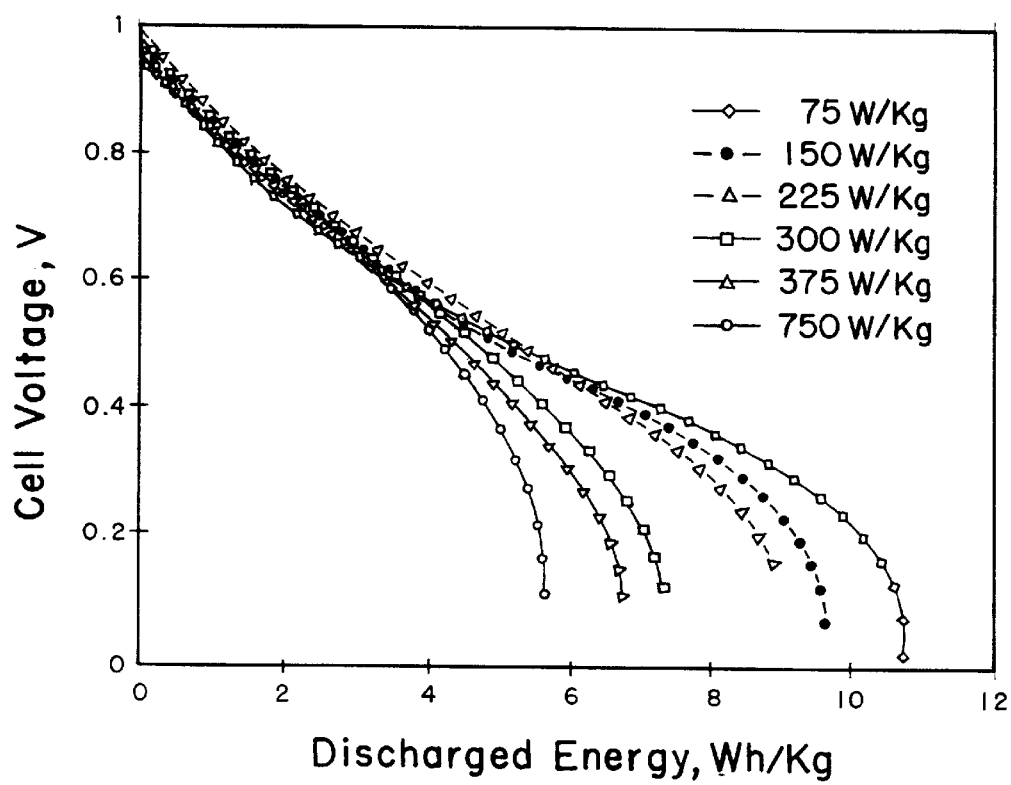
FIG. 8 is a graphic representation of the electrochemical performance of a galvanic capacitor incorporating lead ruthenate electrodes in accordance with the present invention.

A pseudo-capacitor fabricated with the lead ruthenate pyrochlore electrode of the present invention significantly increases the pseudo-capacitance, and hence improves the specific energy of the energy storage device. The inventive energy storage device also exhibits excellent performance in a 2M $H_2SO_4$ electrolyte solution as shown in FIG. 7. Under constant power discharge a galvanic capacitor made with lead ruthenate electrodes exhibits a specific energy of more than 5 Wh/kg at 500 W/kg power level as shown in FIG. 8. The amount of ruthenium and/or iridium in these electrodes can also be reduced by increasing the lead content by using $Pb_2(IrPb)O_{6.5}$. This material contains only 10% ruthenium metal compared to 76% in ruthenium dioxide used in existing pseudo-capacitors, while outperforming such capacitors made with ruthenium dioxide electrodes. The low amount of ruthenium in lead ruthenate is particularly important for a low cost energy storage device.

A pseudo-capacitor in accordance with the present invention exhibits significantly greater redox reactions than observed in the conventional ruthenium dioxide electrode configuration. The lead ruthenate as described above can be synthesized at a low temperature (40°–80° C.) from the solution phase route with very high surface area (10–150 m²/g) and a high electronic conductivity. These three characteristics, i.e., the high surface area, high electronic conductivity, and increased pseudo-capacitance are the key components for the high energy/power density pseudo-capacitor of the present invention.

There has thus been shown a pseudo-capacitor having a high energy storage capacity arising from a double layer capacitance as well as a Faradaic or battery-like redox reaction. The latter is frequently referred to as pseudo-capacitance and gives rise to a much greater capacitance than that of the typical ruthenate oxide ultracapacitor which develops only charge separation-based double layer capacitance. The capacitor employs a lead or bismuth/ruthenate or iridium system having the formula $$A_2[B_{2-x}Pb_x]O_{7-y},$$

where

A=Pb and/or Bi,

B=Ru and/or Ir, and $$0<x\leq 1,$$

$$0<y<0.5,$$

which limits the amount of ruthenate in the electrodes while increasing the energy storage capacity. The ruthenate can be synthesized at low temperatures (40°–80° C.) to form a compound having a high surface area (10–150 m²/g) and high electronic conductivity. By increasing the lead (and/or bismuth) content in the lead ruthenate (and/or iridium) system, the amount of ruthenate (and/or iridium) can be substantially reduced realizing a corresponding reduction in cost.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawing is offered by way of illustration only and not as a limitation. The actual scope of the invention is intended to be defined in the following claims when viewed in their proper perspective based on the prior art.

The embodiments of the invention in which an exclusive property or privilege is claimed are defined as follows:

1. A pseudo-capacitor electric energy storage device comprising lead ruthenate and/or lead iridium electrodes, wherein said electrodes have a large number of micropores and a capacitance arising from double layer capacitance due to charge separation in the micropores of said electrodes and further arising from a Faraday redox reaction, and wherein said lead ruthenate and/or lead iridium electrodes include high surface area carbon disposed between particles of said lead ruthenate and/or lead iridium for increasing electrical contact between said particles and the double layer capacitance due to charge separation, and wherein said electrodes have the formula $$A_2[B_{2-x} Pb_x]O_{7-y},$$

where

A=Pb and/or Bi,

B=Ru and/or Ir, and $0<x\leq1,$ $0<y<0.5.$

2. The pseudo-capacitor electric energy storage device of claim 1 wherein said lead ruthenate and/or lead iridium electrodes are respectively comprised of calcined lead ruthenate or calcined lead iridium, and wherein the contribution of the Faraday redox reaction to the capacitance of said pseudo-capacitor storage device increases with increasing calcining of said electrodes.

3. The pseudo-capacitor electric energy storage device of claim 1 wherein said electrodes are comprised of 10% by weight of ruthenium or iridium metal.

* * * * *

UNITED STATES PATENT AND TRADEMARK OFFICE
CERTIFICATE OF CORRECTION

PATENT NO. : 5,841,627
DATED : 11/24/98
INVENTOR(S) : JAI PRAKASH ET AL.

It is certified that error appears in the above-identified patent and that said Letters Patent is hereby corrected as shown below:

In column 3, line 30, "70°." should be -- 700° --.

Signed and Sealed this

Eleventh Day of May, 1999

Attest:

Q. TODD DICKINSON

*Attesting Officer*    Acting Commissioner of Patents and Trademarks

UNITED STATES PATENT AND TRADEMARK OFFICE
CERTIFICATE OF CORRECTION

PATENT NO. : 5,841,627
DATED : November 24, 1998
INVENTOR(S) : Jai Prakash, et al.

It is certified that error appears in the above-identified patent and that said Letters Patent is hereby corrected as shown below:

On the title page, item [73] Assignee, should read:

The University of Chicago

Chicago, IL

Signed and Sealed this

Tenth Day of August, 1999

Q. TODD DICKINSON

Attest:

*Attesting Officer*      *Acting Commissioner of Patents and Trademarks*